No. 750,412. PATENTED JAN. 26, 1904.
H. C. STOUFFER.
NUT LOCK.
APPLICATION FILED JULY 9, 1903.
NO MODEL.
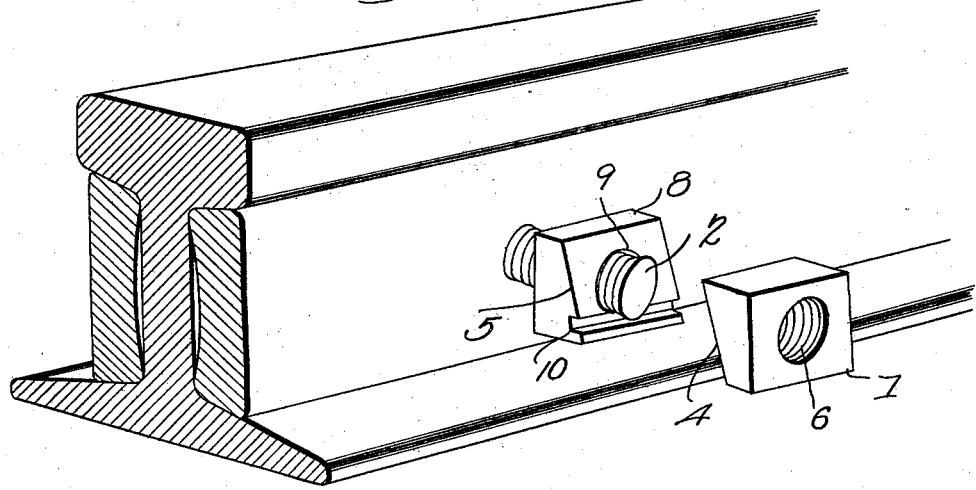
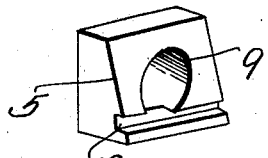
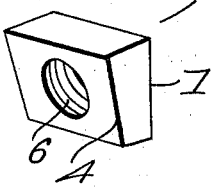
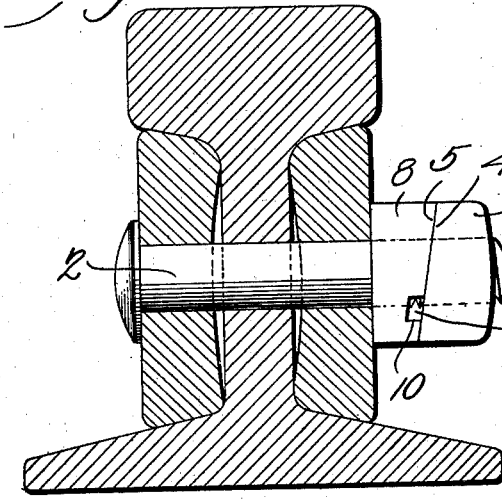
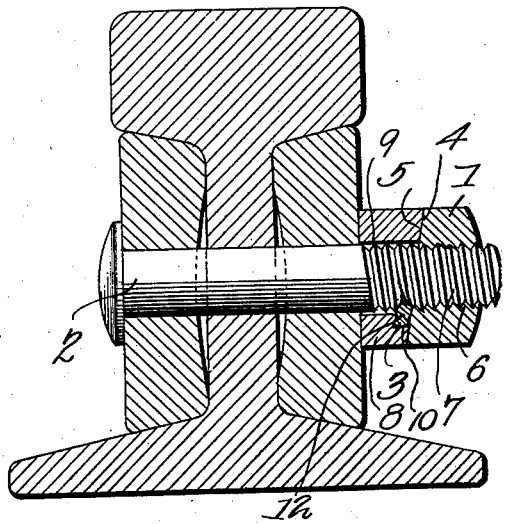
Witnesses
E. F. Stewart
Wm. Bagger
H. C. Stouffer, Inventor.
by C. A. Snow & Co.
Attorneys No. 750,412.

Patented January 26, 1904.

UNITED STATES PATENT OFFICE.

HIRAM C. STOUFFER, OF MINERALRIDGE, OHIO, ASSIGNOR OF FIVE-SIXTHS TO ALEXANDER T. HUNT, ELMER O. DILLEY, AND HENRY E. DILLEY, OF WARREN, OHIO, JAMES C. HUNT, OF LEAVITTSBURG, OHIO, AND CLIFFORD M. HUNT, OF NEWCASTLE, PENNSYLVANIA.

NUT-LOCK.

SPECIFICATION forming part of Letters Patent No. 750,412, dated January 26, 1904.

Application filed July 9, 1903. Serial No. 164,895. (No model.)

*To all whom it may concern:*

Be it known that I, HIRAM C. STOUFFER, a citizen of the United States, residing at Mineralridge, in the county of Trumbull and State of Ohio, have invented a new and useful Nut-Lock, of which the following is a specification.

This invention relates to that class of nut-locks in which the nut is secured against turning upon the bolt by slightly mutilating or distorting the threads of the latter.

Heretofore nuts have been applied to bolts and held securely thereon by means of keys driven transversely through the bolt in such a manner as to mutilate the threads thereof, and thereby hold the nut securely in position against turning. Such construction, while efficient to the extent of holding the nut securely, has been objectionable for the reason that in the act of subsequently removing the nut when this for any reason shall have been necessary the threads not only of the bolt, but likewise those of the nut, have been injured to such an extent as to render further use thereof impossible.

By my present invention I aim to combine with a nut of peculiar shape a washer, likewise of peculiar shape and having a face corresponding with the adjacent face of the nut, and to secure the said washer upon the bolt in locked position by means of a transversely-arranged key engaging the threads of the bolt, thereby preventing the washer, and consequently the nut which engages the face of the washer, from turning and becoming disengaged from the bolt until the key is withdrawn, when, that portion of the thread which is engaged by the nut being uninjured, the nut may be readily unscrewed without injury to itself or to the outer portion of the thread of the bolt, the washer, the opening in which is of sufficient size to enable it to slide freely over the threaded portion of the bolt, being readily removed with the nut.

In the accompanying drawings, forming a part of this specification, there is illustrated one form of embodiment of the invention capable of carrying the same into practical operation, it being understood that the elements therein exhibited may be changed or varied as to shape, proportion, and exact manner of assemblage within the scope and without departing from the spirit of my invention.

In said drawings, Figure 1 is a perspective view showing the washer of my invention applied to the fish-joint of a railroad-rail and also showing the nut facing the washer and ready to be applied. Fig. 2 is a vertical sectional view of the device in operative position. Figs. 3 and 4 are detail views, respectively, of the nut and the washer. Fig. 5 is a vertical sectional view of the device in operative position, showing in elevation a bolt with the nut and washer in position, but prior to the insertion of the key.

Corresponding parts in the several figures are indicated by similar numerals of reference.

1 in the drawings designates the nut; 2, the bolt; 8, the washer, and 3 the key, which together constitute my improved nut-locking device.

The nut shown in the drawings hereto annexed is of the ordinary square pattern; but it is obvious that any form of nut may be used. This nut is provided on its inner side with an inclined or wedge face 4, which corresponds exactly to the inclined wedge face 5 of the washer 8, the latter being of angular shape corresponding exactly to that of the nut. Said nut and washer when placed together will appear like a single nut divided transversely. The nut 1 has the usual screw-threaded perforation 6, which corresponds with the thread 7 of the bolt 2, upon which it is to be used. The opening 9 in the washer 8 is of such a size as to enable it to slide freely over the threaded portion of said bolt. The outer side or face of the washer, which in practice engages the inner wedge face of the nut, is provided with a transverse recess or key-seat 10, which includes a portion of the central perforation 9, so that in practice the key when driven through said recess will engage a portion of the threads of the bolt, mutilating or distorting the same, and thus preventing the washer from turning. This recess 10 may when desired be made slightly tapering to receive a tapering locking-key; but this is not necessary or essential to the successful operation of the device. The inner flat face of the nut coöperates with the recess 10 to form a drift 11, as clearly indicated in Fig. 5 of the drawings, to guide the key 12 while said key is being inserted and to enable it to remain in position with perfect security.

In the practical operation of this device the nut and washer are placed together with their wedge faces adjacent to each other, so as to constitute practically a single nut which by means of an ordinary wrench may be turned home upon the bolt in connection with which the device is to be used. When the nut and washer have been screwed down as tightly as possible, the key 3, which may be made of steel or other suitable material, is driven through the drift 11, thus engaging a portion of the thread of the bolt adjacent to the central eye or opening in the washer, and thus locking the latter against rotation upon the bolt. Now it will be observed that while the key secures the washer against rotation it does not of itself affect the rotation of the nut, being simply placed against the inner plane face of the latter. This is an important feature of my invention, for the reason that if the nut itself were recessed and the key thus permitted to mutilate even a small portion of the bolt-thread engaged by the nut the object of my invention would not be attained, inasmuch as in the attempt to remove the nut the threads of the latter would be liable to be injured. By my invention, however, when the washer is secured in position the wedge face of said washer being engaged by the wedge face of the nut will positively prevent the latter from rotating, inasmuch as by attempting to turn the nut alone the wide end of said nut would pass into engagement with the wide end of the washer, the only result being to increase the tenacity of the grip of the nut upon the bolt. When the key is removed, which may be readily done, the nut and washer may be readily unscrewed from the bolt, the nut having no engagement with that portion of the bolt-thread which has been mutilated, while the eye or perforation in the washer will enable the latter to easily pass out of engagement with said mutilated portion.

The shape and disposition of the adjacent faces of the nut and washer may be varied within the scope of my invention, the gist of which resides in so securing the washer upon the bolt that the nut by engagement with the face of said washer shall be prevented from rotation.

Having thus described my invention, I claim—

1. In a nut-lock, a bolt, a washer and a nut having meeting faces at other than right angles to the axis of the bolt, and means for mutilating a portion of the threads of the bolt adjacent to the washer to thereby prevent the rotation of the latter.

2. In a nut-lock, a bolt, a nut and a washer having meeting faces at other than right angles to the axis of the bolt, said washer having a recess therein, and a key driven in said recess and engaging the threads of the bolt to prevent the rotation of the washer.

3. In a nut-lock, a bolt, a nut and a washer having meeting faces at other than right angles to the axes of the bolt and nut, a recess in the face of the washer adjacent to the face of the nut and coöperating therewith to form a drift and a key engaging the latter and the threads of the bolt adjacent thereto.

In testimony that I claim the foregoing as my own I have hereto affixed my signature in the presence of two witnesses.

HIRAM C. STOUFFER.

Witnesses:
J. Ross Colhoun,
E. E. Doyle.